United States Patent [19]

Beck

[11] Patent Number: 4,744,831

[45] Date of Patent: May 17, 1988

[54] HOLLOW INORGANIC SPHERES AND METHODS FOR MAKING SUCH SPHERES

[75] Inventor: Warren R. Beck, St. Paul, Minn.

[73] Assignee: Minnesota Mining and Manufacturing Company, St. Paul, Minn.

[21] Appl. No.: 635,658

[22] Filed: Jul. 30, 1984

[51] Int. Cl.$^4$ ............................................. C04B 14/00
[52] U.S. Cl. ................................. 106/288 B; 106/290; 106/309; 264/44; 264/117; 428/402
[58] Field of Search ..................... 106/288 B, 290, 309, 106/308 G, 40 R, 40 V; 264/117, 44; 65/21.4; 428/402

[56] References Cited

U.S. PATENT DOCUMENTS

| | | | |
|---|---|---|---|
| 3,030,215 | 4/1962 | Veatch et al. | 428/406 |
| 3,528,809 | 9/1970 | Farnand et al. | 419/5 |
| 4,111,713 | 9/1978 | Beck | 106/288 |
| 4,393,901 | 7/1983 | Beck | 138/145 |

*Primary Examiner*—Amelia Burgess Yarbrough
*Attorney, Agent, or Firm*—Donald M. Sell; Walter N. Kirn; Roger R. Tamte

[57] ABSTRACT

Novel hollow inorganic spheres are prepared by
(1) tumbling together a mixture comprising
   (a) solidifiable liquid globules that comprise a fugitive organic binder material and a source of volatile void-forming agent and
   (b) a mass of free-flowing inorganic sinterable parting agent particles that are at least partially absorbed into the globules during the tumbling action;
(2) providing conditions under which hollow spheres form in which the sphere walls contain the sinterable particles; and
(3) firing the spheres to remove the binder material and sinter the parting agent particles to form shape-retaining spheres having sintered inorganic walls.

8 Claims, No Drawings

HOLLOW INORGANIC SPHERES AND METHODS FOR MAKING SUCH SPHERES

BACKGROUND OF THE INVENTION

There is a need for low-density porous ceramic particles as indicated, for example, by Bettis Atomic Power Laboratory's Letter of Inquiry No. WAPD-PP(CP)CC-1670 dated July 31, 1981, and attached specification. This letter of inquiry requests magnetite spheres within the range 0.25 to 1.19 millimeter in diameter, having an apparent (or bulk) density less than 2 grams/cubic centimeter, and a minimum average crush strength of 200 grams as measured by crushing individual spheres between an anvil and a load pin connected to a strain gauge and indicator.

At present, efforts have been made to meet this need with particles made by sol-gel techniques. However, the particles supplied are severely cracked and weak due to the great shrinkage involved when prepared by the sol-gel technique.

SUMMARY OF THE INVENTION

The present invention provides novel hollow ceramic spheres of low density, and a method for making such spheres. The new method is based on the process taught in U.S. Pat. No. 4,111,713, and in brief summary, comprises (A) tumbling together and thoroughly mixing (1) solidifiable liquid globules comprising a thermally fugitive organic binder material and a source of void-forming agent adapted to evolve as a gas and convert the liquid globules to a hollow condition and (2) a mass of minute discrete free-flowing inorganic heat-sinterable parting agent particles selected from metals, metalloids, metal oxides and metal salts that are wetted by, and at least partially absorbed into, the liquid globules during the tumbling action; sufficient parting agent particles being present so that any portion of liquid globules uncovered by parting agent particles tumble against discrete unabsorbed parting agent particles;

(B) providing conditions during the tumbling action, and tumbling for a sufficient time, for the void-forming agent to evolve as a gas and form a central interior space within the liquid globules and for the thus-hollowed liquid globules to solidify;

(C) collecting the converted globules after they have solidified to a shape-retaining condition; and (D) firing the hollow spheres to first burn out the organic binder, and to then sinter the parting agent particles to form hollow shape-retaining spheres.

The novel product produced by this method comprises a free-flowing mass of hollow spheres which individually comprise a solidified seamless spherical exterior wall that defines and encloses a central interior space, the exterior wall of the individual spheres comprising inorganic particulate material selected from said metals, metalloids, metal oxides and metal salts, sintered together to provide a rigid shape-retaining structure.

The spheres can be of low density in comparison to previous forms of particulate ceramic material, are typically porous, and have important advantages in use over previous forms of particulate inorganic material.

DETAILED DESCRIPTION

As indicated above, initial stages of a process of the present invention are of a type taught in U.S. Pat. No. 4,111,713, the disclosure of which is incorporated herein by reference. These initial stages involve preparation of hollow spheres, the exterior wall of which comprises a thermally fugitive binder material and sinterable inorganic particles dispersed in the binder material. By "thermally fugitive" is meant materials that upon heating of the spheres will be removed from the spheres, e.g., by vaporization and/or oxidation or burning. Natural or synthetic organic materials which are readily burned such as corn starch syrup, phenolic resins, acrylics and the like are presently preferred binder materials.

Besides a binder material, the solidifiable liquid globule includes a volatile void-forming agent such as taught in U.S. Pat. No. 4,111,713. Other ingredients may also be included, such as a solvent or other dispersing liquid. In addition, a metal or other inorganic material may be included. Metallic binder combinations can be obtained by using (1) a colloidal dispersion of a metal, metalloid, metal oxide, or metal salt or (2) a metal, metalloid, metal oxide, or metal salt dispersion in a phenolic resin or other organic binder.

Typically the solidifiable liquid globule is formed at room temperature, e.g., by dissolving the binder material in a solvent or dispersing it in another liquid. However, solid granules of binder material that become liquid during the tumbling operation may also be used.

During the sphere-forming operation the binder material should achieve a viscosity that is low enough for the parting agent particles to be wetted by the globules, and preferably low enough so that any cells forming inside an evacuated globule will tend to at least partially coalesce, whereby binder material will be concentrated at the exterior spherical wall or shell of the sphere. At the same time the viscosity of the binder material should be high enough so that the expanded globule will not deform excessively while sphere formation is taking place. The useful range of viscosities for the binder material is broad, ranging from at least about 50 to 100,000 centipoises, but an especially preferred range is between about 100 and 10,000 centipoises. The globules of binder material in the tumbling, sphere-forming operation are termed liquid herein, since even when at high viscosity they are flowable. The range of useful viscosities will vary with particle size and the ease with which the parting agent particles can be wet. Surfactants can be used to advantage either as an ingredient in the binder material or as a treatment on the parting agent particle.

The parting agent particles used in practicing the invention should be solid discrete free-flowing particulate material which is sufficiently inert, including sufficiently nonmelting, during the sphere-forming operation to retain a parting function. In addition, parting agents that eventually become the primary or only constituent of the sphere walls should be sinterable inorganic materials. Suitable metal parting agents are iron, copper, nickel and the like. Suitable metalloid parting agents include carbides such as silicon carbide, nitrides such as boron nitride, borides, silicides and sulfides. Suitable metal oxide parting agent particles include alumina, zirconia, magnetite, silica, mullite, magnesite, spinels and the like. Suitable metal salt parting agent particles include metal hydroxides, nitrates, and carbonates.

Mixtures of different parting agent particles are used in some embodiments of the invention. For example, parting agent particles providing better flow properties, e.g., spheres, which may or may not be sinterable, may be mixed with irregular sinterable parting agent particles. Alternatively, mixtures are used to provide pigmentation, flame-retardancy, or variety in physical properties of the final sphere. However, sinterable particles generally constitute at least a majority, and preferably at least 60 volume percent, of the exterior wall of a sphere of the invention so as to obtain adequate coherency and strength.

Generally the parting agent particles will range from a few micrometers up to several hundred micrometers in size. They generally have a diameter no larger than the thickness of the wall of the final hollow sphere.

Generally the solidifiable liquid globules are used in sizes that produce hollow spheres about ½ millimeter to 2 centimeters in diameter. Spheres of the invention can be made with good uniformity of sizes by using binder material granules or globules of uniform size. Further, of course, hollow spheres may be screened after formation to provide desired ranges of size. The invention is generally used to produce macrospheres in any size in which the spheres are self-sustaining during the tumbling action. At the present time the most important uses for spheres of the invention occur when the spheres have an average diameter between about 1 millimeter and 2 centimeters, and most often less than 1 centimeter.

Spheres of the invention are generally round but need not be perfectly spherical; they may be cratered or ellipsoidal, for example. Such irregular, though generally round or spherical, hollow products are regarded as "spheres" herein.

The hollow spheres formed by the invention preferably have a single hollow interior space, such as described in U.S. Pat. No. 4,111,713. In less preferred embodiments, the interior space in the sphere may be divided into a number of cells by interior walls having essentially the same composition as the exterior wall; but even such spheres have an outer wall, usually of rather constant thickness and of greater density, around the interior space. The outer wall is continuous and seamless (that is, without the junction lines resulting when two separately molded hemispheres are bonded together), though the wall may be permeable or porous. The thickness of the outer wall is generally less than about ½ the radius of the sphere and may be quite thin, as thin as 1/50 the radius, for example.

Most often the parting agent particles fill the entire thickness of a wall or shell of the intermediate hollow sphere formed prior to firing. However, if the cure rate or solidification rate of the spheres is quite rapid, or the viscosity of the binder material during the sphere-forming operation is quite high, or the parting agent particles have surface properties that make them difficult to wet, the parting agent particles may be absorbed only part way into the outer wall of the sphere. Even in such cases, the parting agent particles will usually fill at least a major portion (on the order of 70 percent or more) and preferably at least 80 percent of the thickness of the outer shell.

The outer parting agent particles incorporated in the intermediate hollow sphere will be only partially embedded in and will partially protrude (usually at least 70 percent) from the exterior wall of the hollow spheres. In this way the outer parting agent particles form the exterior surface of the spheres that contacts other spheres in the formed mass of spheres. The spheres are thus, at least for the most part, kept separate from one another.

When the outer wall is porous, which is generally the case (and which porosity may be made more pronounced by using large parting agents particles or low-viscosity binder material), the spheres are often useful to absorb a liquid or gaseous fill, which may later solidify or crystallize within the sphere. Such a filling can be achieved by evacuating a mass of the hollow spheres and then immersing it in the filling fluid. If the pores are large enough, colloidal or small particle suspensions may be incorporated. Either after or without filling of the sphere, the outer wall may be sealed as by coating a liquid sealing resin onto the spheres.

Hollow spheres of the invention may be strengthened by impregnating them, e.g., in the sphere wall, with a material that is at least primarily inorganic, and then drying and/or firing the spheres. Useful inorganic materials include a dilute sol-gel or an aqueous solution of a metal, metalloid, metal oxide or metal salt.

Uses for the inorganic hollow spheres of the invention are generally novel. Metallic hollow spheres are useful where electrical conductivity or thermal conductivity are desired, or for decorative purposes. Hollow spheres of magnetite are useful in a variety of applications where low-density magnetic materials are desired. These spheres constitute a preferred embodiment of the present invention. Refractory macrospheres prepared from silica, alumina and the like or combinations thereof are useful as insulating materials, e.g., for furnaces or as "hot toppings" for molten metal castings. Highly refractory insulating bricks can be made. High strength alumina spheres are useful, e.g., as oil well proppants, and constitute another preferred embodiment of the invention. High strength spheres in general are useful as fillers in structural components.

The spheres of the present invention are fired to remove, i.e., burn out or vaporize, the fugitive components, and then sintered by raising the temperature. This operation can be carried out as 2 separate processes, or as two phases of one process. Firing will generally be carried out at 500° C. or higher. Sintering, which is the slow solid state diffusion or growing together of a mass of particulate matter achieved by heating to a temperature below melting but high enough for ionic migration to take place, is generally carried out at 700 ° to 1700° C., or even higher.

EXAMPLE 1

Reagent-grade aluminum oxide (supplied by Merck Inc., Rahway, N. J.) with average particle size about 100 microns was heated in a 12 inch pan rotating at 15 rpm. Ten grams of a 10.5% aluminum oxide sol (Dispal M, supplied by Philadelphia Quartz Co.) was thickened with 10 grams of white corn syrup (Karo, supplied by Corn Products Co., Chicago, Ill.). This solution was dropped slowly into the bed of aluminum oxide. The pan was heated from below to a temperature of 100° C. Hollow macrospheres formed in about 2 minutes, with water serving as a blowing agent.

The hollow spheres were then heated in air, first to 500° C. whereupon the organic ingredients in the spheres were burned out, and then to 1500° C., whereupon the aluminum oxide particles became sintered together.

The resulting macrospheres were approximately 3 mm in diameter. The wall strength and density can be varied by varying the particle size of the alumina, i.e., larger particles of alumina provide higher density and greater wall strength during sphere formation, though smaller particles are more easily sintered and thereby provide strength.

EXAMPLE 2

Using the method of Example 1, silica was used as parting agent to provide hollow macrospheres. The silica was No. zero sand and ranged in size from 100 to 250 microns in diameter. The sand was formed into spheres by tumbling with a binder prepared by mixing in equal amounts 34% silicon dioxide sol (Nalco No. 1034A, Nalco Chemical Co., Oak Brook, Ill.) and white Karo corn syrup. The organics were burned out by heating the spheres slowly to 500° C. Thereupon the spheres were heated to 1400° C. to sinter the silica. The resulting spheres were about 3 mm in diameter, thick walled and slightly irregular.

EXAMPLE 3

Granules of phenolic resin (Reichhold No. 5499, Reichhold Chemical Co., Niagara Falls, N. Y.) in 20-40-mesh sizes were dropped into a heated tumbling bed of reagent grade alumina particles having an average diameter of about 100 micrometers (supplied by Merck). The granules of phenolic resin first melted to form liquid globules and after about five minutes solid hollow spheres were formed with alumina particles filling the sphere walls. The spheres were then heated to 500° C. to burn out the phenolic ingredient and the spheres were then heated to 400° C. to sinter the alumina particles. The spheres had a radius of two to three millimeters and the walls were about one-third the radius dimension.

EXAMPLE 4

Pigment-grade iron oxide ($Fe_2O_3$) having an average particle size of about ⅓ micrometer was dispersed in melted starch (67% starch concentration). The mixture was cooled to solidify the starch, and the resulting composite crushed and screened leaving composite particles of about 10 to 44 microns (less than 325 mesh). A mass of the iron oxide starch composite particles were tumbled at 150° C., and 18-to-35 mesh granules of phenolic resin (varcum 29-622, supplied by Reichold Chemical Co.) dropped into the tumbling mass. Intermediate hollow spheres with central voids about ⅓ their diameter were formed.

The spheres were fired at 700° C. to burn out the organics and form hollow iron oxide spheres, whereupon the iron oxide spheres were refired to 980° C. to sinter the iron oxide particles and form hollow magnetite spheres. The average diameter of the product spheres was 1 mm, the density range 2.0 to 2.5 grams per cc, and the individual particle crushing strength over one pound (over about 450 grams).

EXAMPLE 5

Finished spheres from Example 4 were wetted with a 9% $Fe_2O_3$ aqueous sol (Nyacol, Inc., Ashland, MA) and excess sol blotted off with filter paper. The product was dried at 300° C., then screened to break up any clusters. The spheres were placed in a refractory boat in a muffle furnace and heated to 980° C. for 1 hour to sinter the $Fe_2O_3$ particles from the sol together and to the iron oxide of the initial spheres.

The finished spheres appeared no different visually from the finished spheres of Example 4, but the individual particle crushing strength was increased to about two pounds (about 900 grams).

EXAMPLE 6

To 200 g of 45-to-100 mesh bauxite aluminia (Terra Tek Co., Salt Lake City, Utah) was added 2 grams of Argo starch (Best Foods, Englewood Cliffs, N.J.). This mixture was tumbled in a 12-inch pan and heated to 100° C., whereupon 20-to-35 mesh phenolic resin (Yarcum 29-622) was slowly dropped into the tumbling alumina. Tumbling and heating was continued to 180° C. in 5 minutes. Spheres with 0.5 to 1.5 mm diameter and a central void of about 20% were produced. This product was slowly heated to 600° C. to eliminate the organic binder, then fired at 1500° C. for one hour to sinter. The product had a bulk density of 1.2 gram per cc and fair strength.

What is claimed is:

1. A free-flowing mass of hollow spheres which individually comprise a solidified seamless spherical exterior wall that defines and encloses a central interior space, the exterior wall of the individual spheres being at least about ⅓ millimeter thick and comprising inorganic particulate material selected from metals, metalloids, metal oxides and metal salts sintered together to provide a rigid shape-retaining structure.

2. Hollow spheres of claim 1 wherein the inorganic material is selected from aluminum silicate, alumina, magnetite, silica, spinels and zirconia.

3. Hollow spheres of claim 1 wherein the inorganic material includes metallic components selected from copper, nickel, iron, silicon, aluminum and zirconium.

4. Hollow spheres of claim 1 which have been impregnated with an inorganic-containing material and heated to incorporate the additional inorganic material in the spheres.

5. A method for forming hollow inorganic spheres comprising
   (A) tumbling together and thoroughly mixing (1) solidifiable liquid globules comprising a thermally fugitive organic binder material and a source of void-forming agent adapted to evolve as a gas and convert the liquid globules to a hollow condition and (2) a mass of minute discrete free-flowing inorganic heat-sinterable parting agent particles selected from metals, metalloids, metal oxides and metal salts that are wetted by, and at least partially absorbed into, the liquid globules during the tumbling action; sufficient parting agent particles being present so that any portion of liquid globules uncovered by parting agent particles tumble against discrete unabsorbed parting agent particles;
   (B) providing conditions during the tumbling action, and tumbling for a sufficient time, for the void-forming agent to evolve as a gas and form a central interior space within the liquid globules and for the thus-hollowed liquid globules to solidify;
   (C) collecting the converted globules after they have solidified to a shape-retaining condition; and
   (D) firing the hollow spheres to first burn out the organic binder, and to then sinter the parting agent particles to form hollow shape-retaining spheres.

6. A method of claim 5 in which the fugitive organic binder material comprises corn starch.

7. A method of claim 1 comprising impregnating the sintered spheres completed in Step D with an inorganic-containing matrial and re-firing the spheres.

8. Spheres of claim 1 in which the exterior wall of the spheres is at least about ⅔ millimeter thick.

* * * * *